United States Patent
Cheng

(10) Patent No.: US 11,319,229 B2
(45) Date of Patent: May 3, 2022

(54) AERATION DEVICE

(71) Applicant: Man Chung Daniel Cheng, Hong Kong (HK)

(72) Inventor: Man Chung Daniel Cheng, Hong Kong (HK)

( * ) Notice: Subject to any disclaimer, the term of this patent is extended or adjusted under 35 U.S.C. 154(b) by 89 days.

(21) Appl. No.: 16/865,466

(22) Filed: May 4, 2020

(65) Prior Publication Data

US 2021/0238073 A1 Aug. 5, 2021

(30) Foreign Application Priority Data

Feb. 3, 2020 (CN) .......................... 202010078420.7

(51) Int. Cl.

| | | |
|---|---|---|
| *C02F 3/20* | (2006.01) | |
| *C02F 1/74* | (2006.01) | |
| *B01F 23/231* | (2022.01) | |
| *B01F 25/312* | (2022.01) | |
| *B01F 101/00* | (2022.01) | |

(52) U.S. Cl.
CPC .......... *C02F 3/20* (2013.01); *B01F 23/23121* (2022.01); *B01F 25/31242* (2022.01); *C02F 1/74* (2013.01); *B01F 23/231231* (2022.01); *B01F 2101/305* (2022.01)

(58) Field of Classification Search
CPC .. B01F 5/0428; B01F 3/04099; B01F 5/0413; B01F 5/0426; B01F 5/0475; C02F 1/74; C02F 3/20
USPC ...................... 261/76, DIG. 25, 116; 210/150
See application file for complete search history.

(56) References Cited

U.S. PATENT DOCUMENTS

| | | | | |
|---|---|---|---|---|
| 4,761,077 A | * | 8/1988 | Werner .............. | B01D 19/0057 137/896 |
| 8,561,972 B2 | * | 10/2013 | Neville ................. | B01F 3/0451 261/76 |

FOREIGN PATENT DOCUMENTS

| | | | |
|---|---|---|---|
| CN | 2667218 Y | | 12/2004 |
| CN | 204803102 U | * | 11/2015 |
| CN | 106975375 A | | 7/2017 |
| CN | 206799246 U | | 12/2017 |
| CN | 207699310 U | | 8/2018 |

OTHER PUBLICATIONS

English Machine Translation, CN 204803102, Ye, pp. 1-4 (Year: 2015).*

* cited by examiner

*Primary Examiner* — Claire A Norris

(57) ABSTRACT

An aeration device pertaining to the technical field of sewage treatment includes a flow mixing chamber and an air inlet chamber. The flow mixing chamber has a liquid inlet opening, a liquid outlet opening, and an air inlet hole penetrating the chamber wall and located inside the air inlet chamber. The air inlet chamber has an air inlet opening and an interior space whose cross-sectional area is gradually reduced along the liquid flow direction in the flow mixing chamber. The cross-sectional area and number of the air inlet hole can be properly set in order for the mixed fluid produced by the aeration device to have relatively high-density small-diameter air bubbles that contribute to mixing the liquid flow and air flow sufficiently, dissolving oxygen rapidly and sufficiently into the liquid flow, increasing the oxygen dissolution rate of the mixed fluid, and enhancing aeration efficiency.

8 Claims, 3 Drawing Sheets

AERATION DEVICE

CROSS REFERENCE TO RELATED APPLICATIONS

The present application claims the benefit of Chinese Patent Application No. 202010078420.7 filed on Feb. 3, 2020, the contents of which are incorporated herein by reference in their entirety.

BACKGROUND OF THE INVENTION

Technical Field

The present invention pertains to the technical field of sewage treatment. More particularly, the invention relates to an aeration device.

Description of Related Art

Aeration devices are widely used in the sewage treatment industry. For example, Published Chinese Utility Model Patent Application No. CN206799246U discloses a jet-flow aeration device with an adjustable nozzle. This aeration device mixes a liquid flow and an air flow in a mixing chamber so as to produce an air-liquid mixed fluid and thereby achieve the objective of dissolving oxygen in the liquid flow.

The conventional aeration devices, however, produce relatively low-oxygen-content air-liquid mixed fluids and have relatively low aeration efficiency.

SUMMARY OF THE INVENTION

One objective of the present invention is to provide an aeration device that has high aeration efficiency.

To achieve the above objective, the aeration device provided by the present invention includes a flow mixing chamber and an air inlet chamber. The flow mixing chamber has a liquid inlet opening, a liquid outlet opening, and air inlet holes that penetrate the chamber wall of the flow mixing chamber. The air inlet hole has an outer hole opening located in the interior space of the air inlet chamber. The air inlet chamber has an air inlet opening. The cross-sectional area of the interior space of the flow mixing chamber is gradually reduced along the liquid flow direction in the flow mixing chamber.

According to the above, the aeration device of the present invention has such a structural design that while the aeration device is in operation, a liquid flow and an air flow enter the aeration device through the liquid inlet opening and the air inlet opening respectively, and that due to the Venturi effect, the liquid flow generates a suction force while flowing through the flow mixing chamber, whose interior cross-sectional area is gradually reduced along the direction of the liquid flow. The suction force causes the air flow in the air inlet chamber to flow through the air inlet hole into the interior space of the flow mixing chamber. As a result, the liquid flow and the air flow are mixed in the interior space of the flow mixing chamber and form a mixed fluid that is discharged through the liquid outlet opening. The aeration device of the invention allows the size of the air bubbles in the mixed fluid to be set by setting the cross-sectional area of the air inlet hole, and the density of the air bubbles in the mixed fluid by setting the number of the air inlet hole. Therefore, an aeration device adopting the invention is advantageous in that it can produce relatively high-density small-diameter air bubbles in the mixed fluid, that it allows the air flow and the liquid flow to be sufficiently mixed, that oxygen can be rapidly and sufficiently dissolved in the liquid flow, that a relatively high dissolution rate of oxygen in the mixed fluid can be obtained, and that relatively high aeration efficiency can be achieved.

Preferably, the flow mixing chamber is in the form of a conical pipe.

Preferably, there are at least two air inlet holes, and the air inlet holes are distributed along the circumferential direction of the flow mixing chamber.

According to the above, the flow mixing chamber can suck in small jets of air flow through various spots along its circumference, and this is helpful in mixing the liquid flow in every circumferential portion of the interior space of the flow mixing chamber with the air flow sufficiently, allowing oxygen to be dissolved rapidly and sufficiently in the liquid flow in every part of the interior space of the flow mixing chamber, increasing the dissolution rate of oxygen in the mixed fluid, and enhancing aeration efficiency.

Preferably, the air inlet hole has a hole opening whose degree of openness in the circumferential direction of the flow mixing chamber is gradually increased along the liquid flow direction in the flow mixing chamber.

According to the above, the degree of openness of the hole opening of the air inlet hole will match the suction force in the interior space of the flow mixing chamber.

Preferably, the aeration device further includes a liquid inlet pipe and a liquid outlet pipe. The liquid inlet pipe is in communication with the liquid inlet opening. The liquid outlet pipe is in communication with the liquid outlet opening. The flow mixing chamber is located in the interior space of the air inlet chamber. The liquid inlet pipe and the liquid outlet pipe are exposed from the air inlet chamber.

According to the above, disposing the flow mixing chamber in the interior space of the air inlet chamber helps simplify the structure, and thereby facilitate the manufacture, of the aeration device.

Preferably, the air inlet hole is mounted with a porous screen, and the porous screen has a plurality of through holes.

According to the above, forming small-diameter through holes in a porous screen and then mounting the porous screen to the air inlet hole helps reduce the difficulty of manufacture of the aeration device because it will be more difficult to make small-diameter air inlet holes directly in the chamber wall of the flow mixing chamber.

Preferably, the through holes are circular holes and have diameters ranging from 10 μm to 2000 μm.

The aforesaid hole configuration and diameter range are advantageous in that they allow an air flow that enters the interior space of the flow mixing chamber through the through holes to produce micrometer-scale and nanoscale small-diameter air bubbles, which can mix, and make sufficient contact, with the liquid flow in the interior space of the flow mixing chamber more easily than larger air bubbles; that oxygen can dissolve more rapidly in the liquid flow than when larger air bubbles are produced; that the dissolution rate of oxygen in the mixed fluid can be increased; and that aeration efficiency can be enhanced.

Preferably, the through holes are conical holes, with the large-end hole opening of each conical through hole in communication with the interior space of the flow mixing chamber, and the small-end hole opening of each conical through hole in communication with the space outside the flow mixing chamber.

According to the above, should solid particles enter the through holes, the flow mixing chamber will be able to suck in the solid particles with ease, thereby preventing the solid particles from blocking the through holes. This helps ensure that the through holes keep providing smooth passage and that the aeration device can work properly for a long time. Compared with holes of other shapes, the conical holes also enable a larger area of contact between the air flow and the liquid flow, which in turn contributes to high aeration efficiency.

Preferably, the porous screen is curved from the air inlet hole toward the interior space of the flow mixing chamber.

The aforesaid porous screen configuration is advantageous in that the area of the porous screen, and hence the number of the through holes in the porous screen, will be increased, and so will the air intake of the flow mixing chamber, the density of the air bubbles in the mixed fluid, and the dissolution rate of oxygen in the mixed fluid. Moreover, the porous screen, if curved toward the interior space of the flow mixing chamber, will produce a stirring effect on the fluid in the flow mixing chamber, and this contributes to mixing the air flow and the liquid flow sufficiently and evenly, accelerating the dissolution of oxygen in the liquid flow, increasing the dissolution rate of oxygen in the mixed fluid, and enhancing aeration efficiency.

Preferably, the through holes can be divided by cross-sectional area into at least two types; the through holes of each type are arranged in a plurality of rows and a plurality of columns; and for each type of through holes, the through holes in each row constitute a hole set, and each of the through holes in the same hole set is distributed in such a way that it is staggered with the through hole of an adjacent hole set.

According to the above, arranging relatively small-cross-sectional-area through holes in the spaces between relatively large-cross-sectional-area through holes helps increase the density of the through holes in the porous screen, the air intake, and the dissolution rate of oxygen in the mixed fluid. Furthermore, the through holes help increase disturbance in the fluid in the flow mixing chamber when having different cross-sectional areas, and can produce a stirring effect on the fluid in the flow mixing chamber when distributed in a staggered manner. The increased disturbance and stirring contribute to mixing the air flow and the liquid flow sufficiently and evenly, increasing the dissolution rate of oxygen in the mixed fluid, and enhancing aeration efficiency.

DETAILED DESCRIPTION OF THE INVENTION

Figure 1:
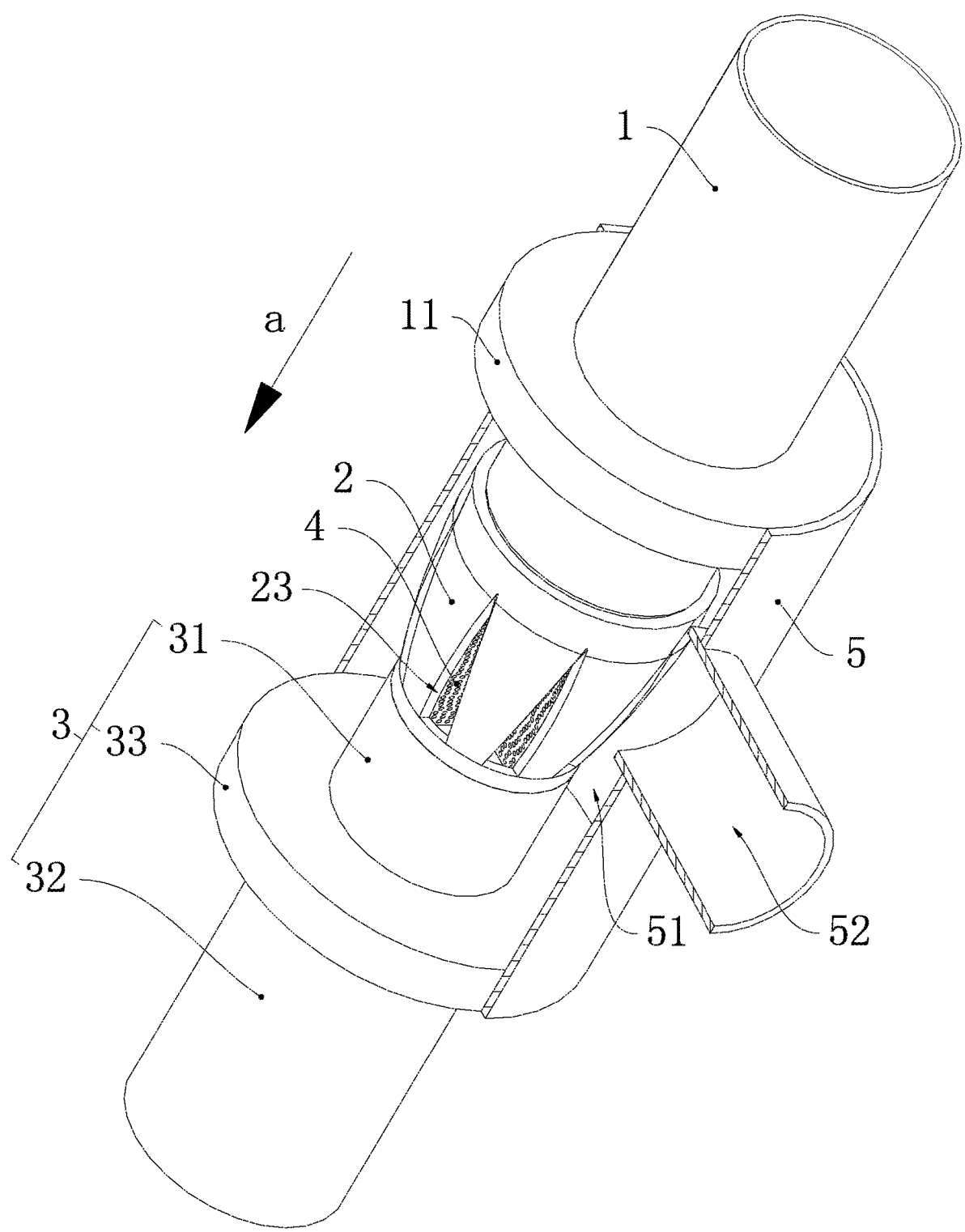
FIG. 1 is a structural diagram of an embodiment of the aeration device of the present invention, with the air inlet chamber shown in a cut-away view.
Figure 2:
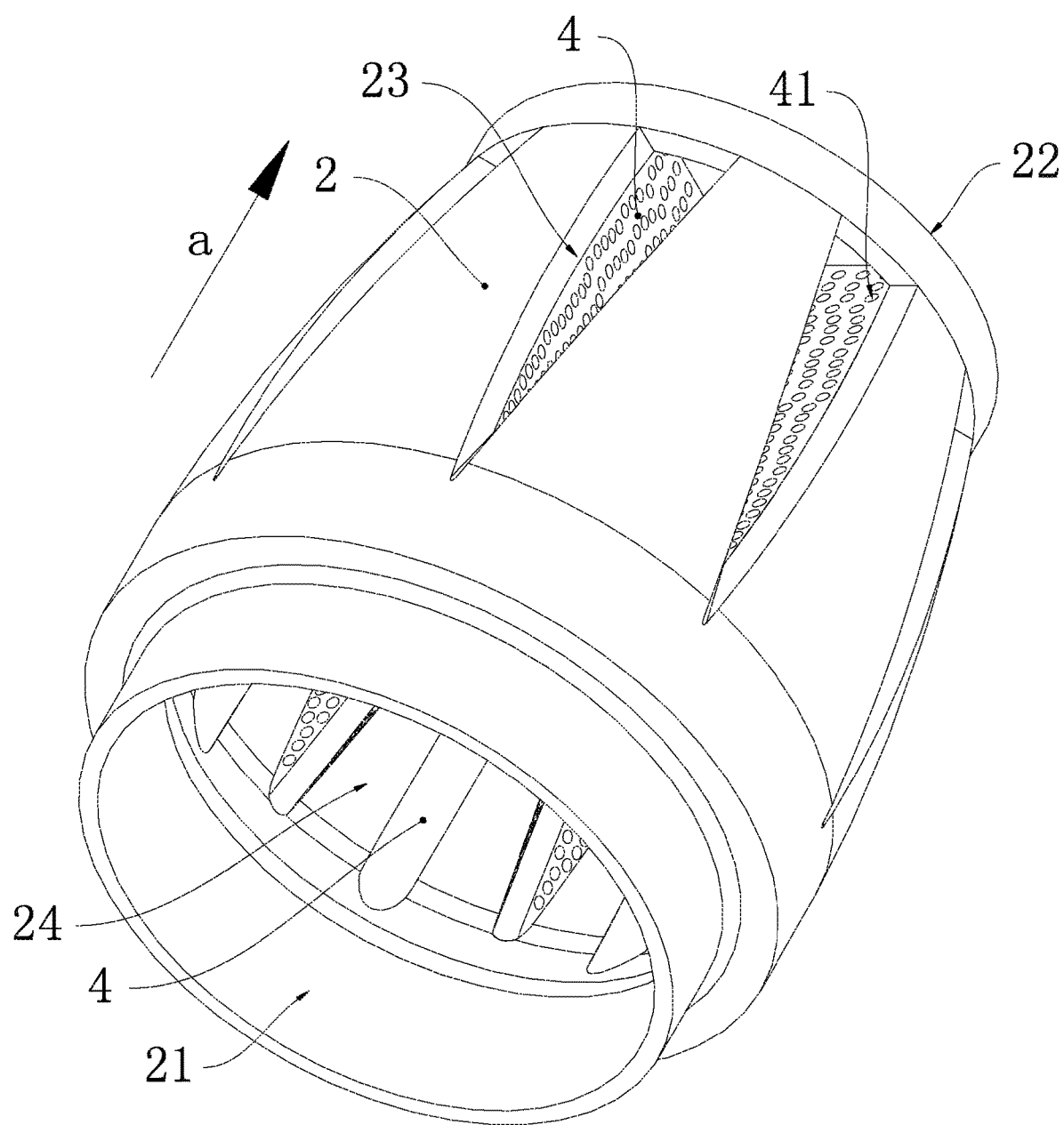
FIG. 2 is a structural diagram of the flow mixing chamber and the porous screens in the aeration device in FIG. 1.

The aeration device shown in FIG. 1 and FIG. 2 includes a liquid inlet pipe 1, a flow mixing chamber 2, a liquid outlet pipe 3, and an air inlet chamber 5. The flow mixing chamber 2 is shaped as a conical pipe. The large-end pipe opening of the conical flow mixing chamber 2 is a liquid inlet opening 21, while the small-end pipe opening of the conical flow mixing chamber 2 is a liquid outlet opening 22. The conical pipe wall of the flow mixing chamber 2 is formed with and penetrated by a plurality of air inlet holes 23. The liquid inlet pipe 1 is in communication with the liquid inlet opening 21 of the flow mixing chamber 2. The liquid outlet pipe 3 is in communication with the liquid outlet opening 22 of the flow mixing chamber 2.

The air inlet chamber 5 has an air inlet opening 52. The flow mixing chamber 2 is located in the interior space 51 of the air inlet chamber 5. Both the liquid outlet pipe 3 and the liquid inlet pipe 1 jut out from inside the air inlet chamber 5.

Each air inlet hole 23 is mounted with a porous screen 4, and each porous screen 4 has a plurality of through holes 41. Each through hole has a circular cross section.

The air flow involved in the mixing process of the aeration device of the afore-cited Published Chinese Utility Model Patent Application No. CN206799246U is relatively large in size and therefore does not make sufficient contact with the liquid flow; as a result, the air flow and the liquid flow are not sufficiently mixed, and the air flow is not sufficiently dissolved in the liquid flow.

By contrast, the aeration device according to this embodiment of the present invention operates in the following manner. A liquid flow enters the aeration device through the liquid inlet pipe 1, and an air flow enters the aeration device through the air inlet opening 52. Due to the Venturi effect, the liquid flow generates a suction force while flowing through the flow mixing chamber 2, which is shaped as a conical pipe. The suction force causes the air flow between the air inlet chamber 5 and the flow mixing chamber 2 to enter the interior space 24 of the flow mixing chamber 2 through the air inlet holes 23. The liquid flow and the air flow are mixed in the interior space 24 of the flow mixing chamber 2, and the resulting mixed fluid is discharged through the liquid outlet pipe 3. The diameters of the through holes 41 are directly related to the diameter of the air bubbles in the mixed fluid: the smaller the diameters of the through holes 41 are, the smaller the diameter of the air bubbles formed will be. Moreover, the smaller the air bubbles are, the faster the oxygen in the air bubbles will be dissolved in the liquid flow. The number of the through holes 41, on the other hand, is directly related to the density of the air bubbles in the mixed fluid: the larger the number of the through holes 41 is, the more densely distributed the air bubbles in the mixed fluid will be. A higher density of the air bubbles contributes to a higher oxygen content of the mixed fluid, more sufficient mixing of the liquid flow and the air flow, and a higher dissolution speed and dissolution rate of oxygen in the liquid flow. Therefore, the aeration device according to this embodiment allows the size and density of the air bubbles in the mixed fluid to be set by setting the diameters and number of the through holes 41, and this contributes to producing relatively high-density small-diameter air bubbles in the mixed fluid, mixing the air flow and the liquid flow sufficiently, dissolving oxygen rapidly and sufficiently in the liquid flow, increasing the dissolution rate of oxygen in the mixed fluid, and enhancing aeration efficiency.

Specifically, the air inlet chamber 5 has a tubular shape, and the air inlet opening 52 is formed in the tube wall of the air inlet chamber 5. The liquid inlet pipe 1 has a first collar 11. The liquid outlet pipe 3 has a small-diameter section 31 and a large-diameter section 32. The small-diameter section 31 is in communication with the liquid outlet opening 22. A second collar 33 is provided between the small-diameter section 31 and the large-diameter section 32. One end of the air inlet chamber 5 is hermetically connected with the first collar 11, and the opposite end of the air inlet chamber 5 is hermetically connected with the second collar 33. The mixed fluid coming out of the liquid outlet opening 22 is reduced in speed while flowing through the large-diameter section 32, and this helps lessen the impact that the mixed fluid may have on the parts of the fluid outlet of the aeration device.

Figure 3:
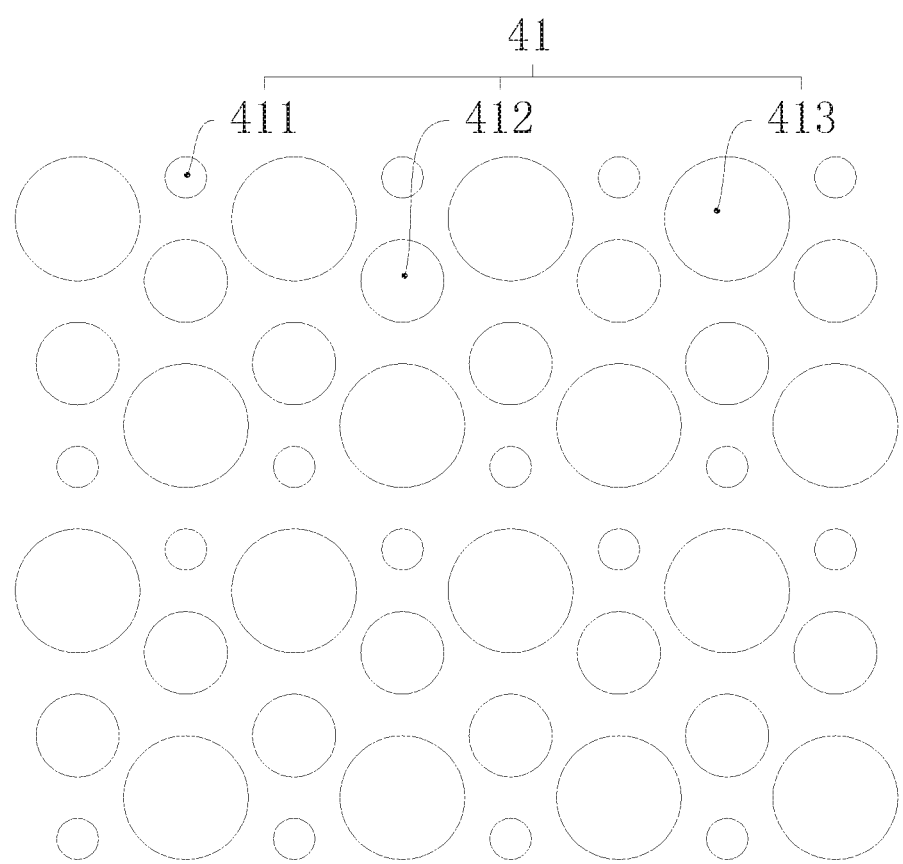
FIG. 3 schematically shows the distribution of the through holes in a porous screen in the aeration device in FIG. 1.

Specifically, referring to FIG. 3, the through holes 41 of each porous screen 4 in this embodiment include first holes 411, second holes 412, and third holes 413. The first holes 411 have a diameter of 100 µm; the second holes 412, 200 µm; and the third holes 413, 300 µm. Each type of through holes 41 are arranged in a plurality of rows and a plurality of columns. The first holes 411 in each row are so distributed as to be staggered with the first holes 411 in an adjacent row, the second holes 412 in each row are so distributed as to be staggered with the second holes 412 in an adjacent row, and the third holes 413 in each row are so distributed as to be staggered with the third holes 413 in an adjacent row. It is understood that the first holes 411 in each column are also staggered with the first holes 411 in an adjacent column, that the second holes 412 in each column are also staggered with the second holes 412 in an adjacent column, and that the third holes 413 in each column are also staggered with the third holes 413 in an adjacent column. The foregoing arrangement helps produce a stirring effect, and hence turbulent flow, in the flow mixing chamber 2, and this in turn contributes to mixing the air flow and the liquid flow sufficiently in the flow mixing chamber 2, increasing the dissolution rate of oxygen in the mixed fluid, and enhancing aeration efficiency.

The aforesaid rows and columns are arranged respectively in two perpendicular directions. Specifically, in the partial view of FIG. 3, each type of through holes 41 is arranged in four rows and eight columns. The four through holes in each row make up a hole set. For each type of through holes 41, each hole set includes four through holes, and each column includes two through holes. It is understood that this embodiment does not preclude a row or column including different types of through holes.

The through holes 41 are not necessarily holes with a circular cross section. The cross-sectional shape of the through holes 41 can be selected as needed and be elliptical instead, for example. It is understood, however, that circular holes can be made with relatively great ease.

Moreover, the through holes 41 are not limited to including the first holes 411, the second holes 412, and the third holes 413. The types, number, cross-sectional areas, and distribution of the through holes 41 can be set differently from those disclosed herein. Preferably, the through holes 41 have diameters ranging from 10 µm to 2000 µm so that an air flow entering the interior space 24 of the flow mixing chamber 2 through the through holes 41 can produce micrometer-scale and nanoscale small-diameter air bubbles. Small-diameter air bubbles can mix, and make sufficient contact, with the liquid flow in the interior space 24 of the flow mixing chamber 2 more easily than larger air bubbles and thereby contribute to accelerating the dissolution of oxygen in the liquid flow, increasing the dissolution rate of oxygen in the mixed fluid, and enhancing aeration efficiency.

Preferably, there are a plurality of air inlet holes 23 as shown in this embodiment, in which there are six air inlet holes 23. It is understood that there may be two, three, four, five, seven, or more than seven air inlet holes 23 instead. The plural air inlet holes 23 are distributed along the circumferential direction of the flow mixing chamber 2, and each air inlet hole 23 is mounted with the porous screen 4. Thus, the flow mixing chamber 2 can suck in small jets of air flow through various spots along its circumference, and this is advantageous to mixing the liquid flow in every circumferential portion of the interior space 24 of the flow mixing chamber 2 with the air flow sufficiently, to dissolving oxygen rapidly and sufficiently in the liquid flow in every part of the interior space 24 of the flow mixing chamber 2, to increasing the dissolution rate of oxygen in the mixed fluid, and to enhancing aeration efficiency.

Preferably, the through holes 41 of each porous screen 4 are conical holes, with the large-end hole opening of each conical through hole 41 in communication with the interior space 24 of the flow mixing chamber 2, and the small-end hole opening of each conical through hole 41 in communication with the space outside the flow mixing chamber 2 (i.e., with the space between the flow mixing chamber 2 and the air inlet chamber 5). Thus, even if solid particles enter the through holes 41, the solid particles can be easily sucked in by the flow mixing chamber 2 and kept from blocking the through holes 41. This helps ensure that the through holes 41 keep providing smooth passage and that the aeration device can work properly for a long time. Compared with holes of other shapes, the conical holes also enable a larger area of contact between the air flow and the liquid flow, which in turn contributes to high aeration efficiency.

Preferably, each porous screen 4 is curved from the conical tube wall of the flow mixing chamber 2 toward the interior space 24 of the flow mixing chamber 2. This porous screen configuration helps increase the area, and consequently the number of the through holes 41, of each porous screen 4; the air intake of the flow mixing chamber 2; the density of the air bubbles in the mixed fluid; and the dissolution rate of oxygen in the mixed fluid. Moreover, when curved toward the interior space 24 of the flow mixing chamber 2, the porous screens 4 can produce a stirring effect on the fluid in the flow mixing chamber 2, and this contributes to mixing the air flow and the liquid flow sufficiently and evenly, increasing the dissolution rate of oxygen in the mixed fluid, and enhancing aeration efficiency.

Preferably, the degree of openness of the hole opening of each air inlet hole 23 is gradually increased along the flowing direction of the liquid flow in the flow mixing chamber 2. Specifically, each air inlet hole 23 has an isosceles hole opening, and the bottom side of each air inlet hole 23 is located at the downstream end. This configuration allows the degree of openness of the hole opening of each air inlet hole 23 to match the suction force in the interior space 24 of the flow mixing chamber 2.

It is understood that, in other embodiments of the present invention, the shape, size, and number of the air inlet holes 23 can be set according to the through holes 41 in the foregoing embodiment while dispensing with the porous screens 4. In that case, the flow mixing chamber 2 will draw in air directly through the air inlet holes 23 during operation of the aeration device, and this configuration is equally capable of enhancing aeration efficiency.

It should be pointed out that the embodiments described above are only some preferred ones of the present invention and are not intended to be restrictive of the scope of the invention. A person of ordinary skill in the art may alter or modify the invention in many different ways. Any modification, equivalent substitution, or improvement that does not depart from the spirit or principle of the invention shall fall within the scope of patent protection sought by the applicant.

What is claimed is:

1. An aeration device, comprising:
a flow mixing chamber and an air inlet chamber, wherein the flow mixing chamber has a liquid inlet opening, a liquid outlet opening, and air inlet holes penetrating a chamber wall of the flow mixing chamber;
a liquid inlet pipe and a liquid outlet pipe, wherein the liquid inlet pipe is in communication with the liquid inlet opening, and the liquid outlet pipe is in communication with the liquid outlet opening;
wherein the air inlet holes have an outer hole opening located in an interior space of the air inlet chamber, and the air inlet chamber has an air inlet opening;
wherein the flow mixing chamber has an interior space whose cross-sectional area is reduced along a direction of a liquid flow in the flow mixing chamber;
wherein the flow mixing chamber is located in the interior space of the air inlet chamber, and both the liquid inlet pipe and the liquid outlet pipe are jutted out from the air inlet chamber; and
wherein each of the air inlet hole is mounted with a porous screen, and the porous screen has a plurality of through holes.

2. The aeration device of claim 1, wherein the flow mixing chamber is shaped as a conical pipe.

3. The aeration device of claim 1, wherein there are at least two air inlet holes, and the air inlet holes are distributed along a circumferential direction of the flow mixing chamber.

4. The aeration device of claim 1, wherein the size of the outer hole opening-increase in the circumferential direction of the flow mixing chamber along the direction of the liquid flow.

5. The aeration device of claim 1, wherein the through holes are circular holes, and the through holes have diameters ranging from 10 µm to 2000 µm.

6. The aeration device of claim 1, wherein the through holes are conical holes and each of the through holes has a large-end hole opening in communication with the interior space of the flow mixing chamber and a small-end hole opening in communication with a space outside the flow mixing chamber.

7. The aeration device of claim 1, wherein the porous screen is curved from the air inlet hole toward the interior space of the flow mixing chamber.

8. The aeration device of claim 1, wherein there are at least two types of the through holes with different cross-sectional area; each type of the through holes are arranged in a plurality of rows and a plurality of columns; for each type of the through holes, the through holes in a same row constitute a hole set; each of the through holes in the same hole set is distributed as to be staggered with the through hole of an adjacent hole set.

* * * * *